United States Patent
Chan

(10) Patent No.: US 9,350,563 B2
(45) Date of Patent: May 24, 2016

(54) PROCEDURE, APPARATUS, AND COMPUTER PROGRAM FOR REDUCING A PROBABILITY OF FRAGMENTATION WHEN SUPPORTING VIRTUAL CONCATENATION (VCAT) SERVICES

(71) Applicant: TELLABS OPERATIONS, INC., Naperville, IL (US)

(72) Inventor: Eric Chan, Naperville, IL (US)

(73) Assignee: CORIANT OPERATIONS, INC., Naperville, IL (US)

( * ) Notice: Subject to any disclaimer, the term of this patent is extended or adjusted under 35 U.S.C. 154(b) by 13 days.

(21) Appl. No.: 14/179,473

(22) Filed: Feb. 12, 2014

(65) Prior Publication Data
US 2015/0229423 A1    Aug. 13, 2015

(51) Int. Cl.
*H04J 14/08*    (2006.01)
*H04L 12/40*    (2006.01)
*H04J 3/08*    (2006.01)

(52) U.S. Cl.
CPC ............. *H04L 12/40* (2013.01); *H04J 3/085* (2013.01); *H04J 2203/0085* (2013.01); *H04J 2203/0094* (2013.01)

(58) Field of Classification Search
CPC ............. H04J 3/1611; H04J 3/1694
See application file for complete search history.

(56) References Cited

U.S. PATENT DOCUMENTS

| 2004/0184803 A1* | 9/2004 | Chang et al. | 398/58 |
| 2011/0058555 A1* | 3/2011 | Hashimoto | 370/392 |

FOREIGN PATENT DOCUMENTS

WO    WO 0217546 A2 *    2/2002

* cited by examiner

*Primary Examiner* — Maharishi Khirodhar
(74) *Attorney, Agent, or Firm* — Fitzpatrick, Cella, Harper & Scinto

(57) ABSTRACT

A procedure, apparatus, system, and medium for transferring traffic across a packet network. In the procedure, a network element bundles a plurality of common (Synchronous Transport Signal) STS-Nc services included in a virtual concatenation group. The network element then transfers the traffic in accordance with the bundled plurality of STS-Nc services. In one example embodiment herein, the plurality of STS-Nc services are STS-1 services, and each bundle of STS-1 services is aligned to a timeslot boundary of an STS-3c service.

17 Claims, 5 Drawing Sheets

PROCEDURE, APPARATUS, AND COMPUTER PROGRAM FOR REDUCING A PROBABILITY OF FRAGMENTATION WHEN SUPPORTING VIRTUAL CONCATENATION (VCAT) SERVICES

BACKGROUND

1. Field

Example aspects described herein relate generally to an apparatus transferring traffic across a network, and more particularly to transferring traffic across a network which supports virtual concatenation (VCAT) services.

2. Description of the Related Art

Generally, the Synchronous Optical Network (SONET) and Synchronous Digital Hierarchy (SDH) transport hierarchies provide voice and private line services using time division multiplexing (TDM). TDM subdivides the bandwidth of an optical channel into smaller usable fragments called time slots.

In such TDM systems supporting different granularities, bandwidth fragmentation can be a problem. Conventionally, when there are different granularities involved such as Synchronous Transport Signal (STS)-1 and STS-3c equivalent members, a transport pipe is packed tightly with the different granularities starting at the first available timeslot(s) available to support the STS-1 or STS-3c member to completely utilize the transport pipe. This can maximize an initial configuration. However, bandwidth can get fragmented, as circuits are added and deleted, leaving behind holes in the transport pipe such that they are not consecutive or aligned to the correct STS-nc boundary. Over time, the network efficiency can be lowered as the free bandwidth is split into multiple non-contiguous slots, thereby causing new demands to be rejected.

SUMMARY

Existing limitations associated with the foregoing, as well as other limitations, can be overcome by providing for a transfer of traffic across a network, where bandwidth fragmentation is minimized by grouping members for common service into a bundle and aligning the grouped members to appropriate service timeslots.

Thus, in an example embodiment described herein, an apparatus bundles a plurality of common (Synchronous Transport Signal) STS-Nc services into groups, the plurality of common STS-Nc services being included in a virtual concatenation group, and transfers the traffic in accordance with the bundled plurality of STS-Nc services.

By virtue of the foregoing arrangement, it can be possible to minimize bandwidth fragmentation by grouping members for common service into a bundle. In particular, bundling, for example, STS-1s to groups of 3 can result in deterministic results where it is possible to guarantee non-blocking at least until the number of STS-1s goes above, for example, 178 STS-1 equivalent in an optical carrier OC192 with 192 STS-1 equivalent. As a result, this arrangement can reduce blocking to minimize bandwidth fragmentation.

In another example embodiment, the plurality of STS-Nc services are STS-1 services, and each bundle of STS-1 services is aligned to a timeslot boundary of an STS-3c service. In this example embodiment, in a case that there are remaining STS-1 services after bundling in one circuit, the remaining STS-1 services are packed together with remaining STS-1 services from other circuits.

In other example embodiments, it is determined whether a data service of the network is supported by STS-1 services or STS-3c services. If it is determined that STS-1c services are supported, then the STS-1 services are bundled into groups of a predetermined quantity, for example, three (3) when possible. In these example embodiments, if it is determined that STS-3c services are supported, an availability of bandwidth and an alignment of the STS-3c services are checked. In one example, based on the checking, if there is available STS-3c bandwidth and there is alignment provided for the STS-3 services, then the STS-3c services are used to transfer the traffic. In another example, based on the checking, if there is available STS-3c bandwidth but there is fragmentation with respect to the alignment of the STS-3c services, then STS-1 services are reallocated to create consecutive timeslots aligned to the STS-3c boundary, and the newly created STS-3c services are used to transfer the traffic.

BRIEF DESCRIPTION OF THE DRAWINGS

The disclosure claimed and/or described herein is further described in terms of exemplary embodiments. These exemplary embodiments are described in detail with reference to the drawings. These embodiments are non-limiting exemplary embodiments, wherein:

DETAILED DESCRIPTION

Figure 1A:
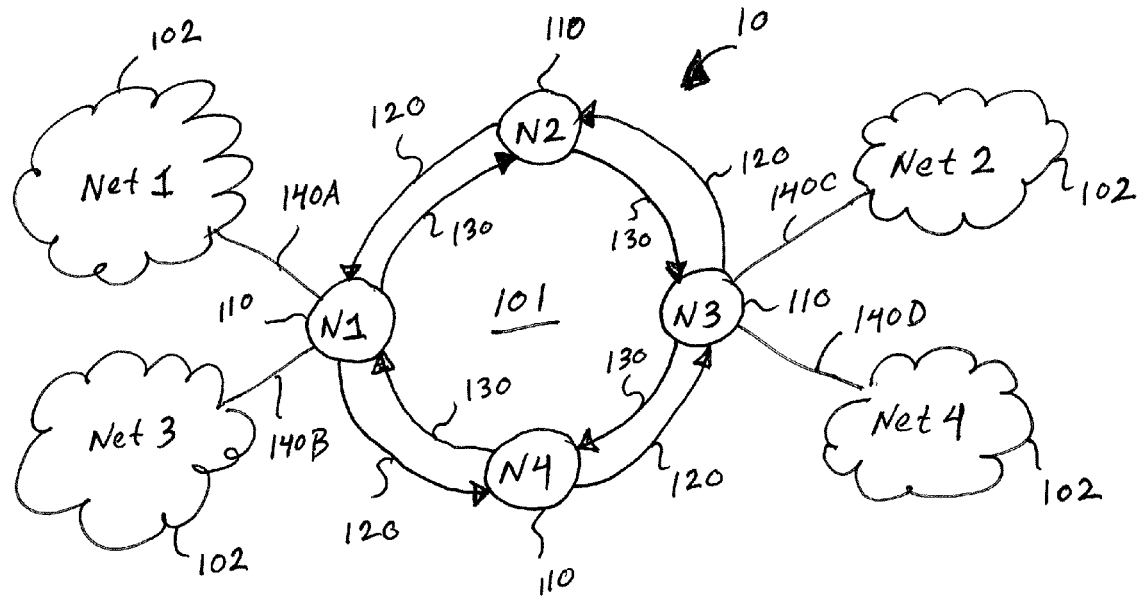
FIG. 1A is a representative view of a communication system that utilizes channelized transport via a network, according to an example embodiment described herein.

FIG. 1A is a representative view of a communication system 10 in which a plurality of network systems are provided with communication paths to other network systems via a transport network, according to an example embodiment described herein. As shown in FIG. 1A, a transport network 101 includes multiple network elements 110 (N1 to N4), coupled in a ring structure by one or more communication paths 120 and 130. In one example embodiment, the transport network 101 is a SONET/SDH network. Of course, this example embodiment is not intended to be limiting, and, in other example embodiments, other types of transport networks could be used.

As shown in FIG. 1A, the two paths 120 and 130 transport a plurality of SONET STS-Nc data streams in opposite directions about the SONET ring 101. In one example embodiment, the communication paths 120 and 130 can include at least one of fiber optic connections (e.g., in SONET and SDH), wired electrical paths, wireless connections (e.g., in other types of networks), or the like. In example embodiments using a fiber optic connection, paths 120 and 130 can be implemented on a single fiber, on dual fibers, or some other combination of fiber connections.

The communication paths 120 and 130 include one or more transport network paths for transporting data from one node 110 to another node 110 in the network 101. The transport network 101 is capable of providing STS-1 transport paths, STS-3c transport paths, STS-12c transport paths, or STS-48c transport paths, or any combination thereof. For example, an optical carrier level of optical carrier level of 192 (OC192) can support on a single path 192 STS-1s, 64 STS-3cs, 16 STS-12cs or 4 STS-48cs. The OC192 in this example also can support a mixture of STS-1s, STS-3cs, STS-12cs, and STS-48cs so long as the total aggregate bandwidth equals 192 equivalent STS-1s. Of course, this example is not limiting, and, in other example embodiments, different optical carrier levels can be employed.

In the transport network 101, in one example embodiment, each network element 110 is coupled to two other network elements 110 in a ring structure. Of course, this example is not limiting, and, in other example embodiments, different network topologies can be used. In one example, network element N2 is coupled to network elements N1 and N3. The coupling between the elements is two way in the illustrated example, meaning that each network element 110 transmits and receives signals to and from each of the two other network elements 110 to which it is connected. Each network 110 includes at least two transmitter/receiver interfaces (not shown), one for each connection to another network element 110. The network elements 110 can be any type of network device, such as an add/drop multiplex (ADM), switch, a Tellabs 7100 network element, an Access hub, or other type of devices.

Figure 1B:
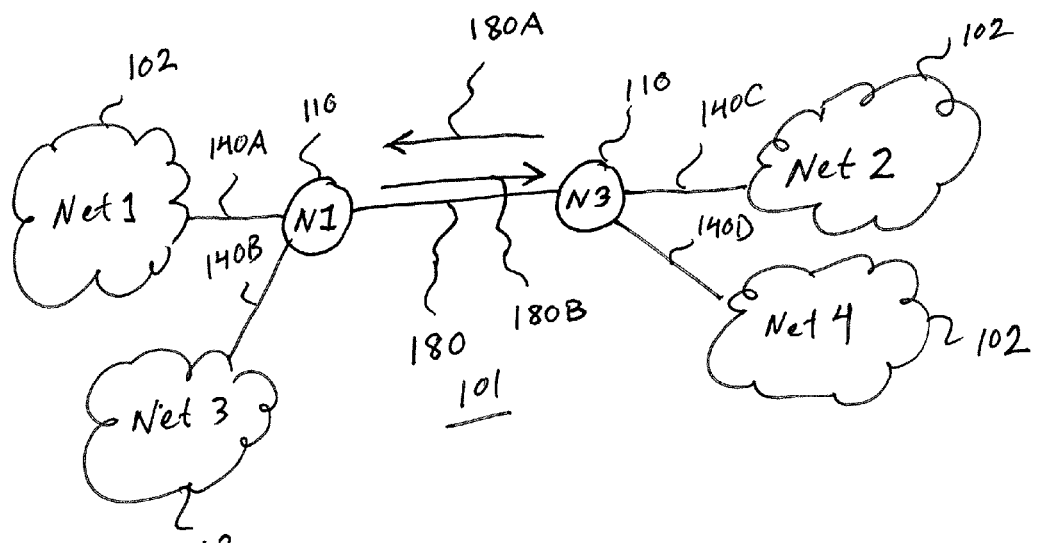
FIG. 1B is another representative view of a communication system that utilizes channelized transport via a network, according to an example embodiment described herein.

In FIGS. 1A and 1B, network element N1 is coupled to two network systems Net1 and Net3, via network access paths 140A and 140B, respectively. In addition, network element N3 is coupled to two network systems Net2 and Net4, via network access paths 140C and 140D, respectively. In the example embodiment illustrated in FIG. 1B, the transport network 101 provides a network path 180 including paths 180A and 180B between network systems Net1 and Net2 and a transport network path 180 including paths 180A and 180B between network systems Net3 and Net4. In the example embodiments illustrated in FIGS. 1A and 1B, each of the network access paths 140A to 140D can be Gigabit Ethernet paths.

Within SONET and SDH transport networks 110 (N1-N4), for example, virtual concatenation (VCAT) can improve flexibility and efficiency. Virtual concatenation (VCAT) is generally an inverse multiplexing technique that enables multiple SONET or SDH channels to be substantially bound into a VCAT group. A VCAT group, which includes "N" members, is effectively a byte-synchronous stream. In general, VCAT enables data, for example, SONET or SDH payloads, to be carried in smaller bandwidth containers such as synchronous payload envelopes (e.g., STS-1 and STS-3c) through a network to a destination at which the data is reassembled. The smaller bandwidth containers are effectively used to create a higher bandwidth overall connection between two end points, for example, between network element N1 and network element N3.

In example embodiments where the network supports STSs, an STS-nc has n consecutive STS-1s worth of bandwidth and starts at the correct STS-nc timeslot boundary. For example, an STS-3c has three consecutive timeslots starting at 1, 4, 7, 10, 13, 16, . . . 189. In one example, when using Ethernet over SONET (EoS) (i.e., Ethernet services over a SONET network), the Ethernet traffic is segmented at, for example, network element 110 (N1) and inserted into the STSs and transported across the SONET network as STSs. The segmented traffic is then reassembled to recreate the Ethernet traffic at the far end, for example, at network element 110 (N3). In this example, STS-1 and STS-3c can be used to carry the Ethernet traffic. In particular, a GbE (Gigabit Ethernet) link can be carried over 22 STS-1s, or the GbE can be carried over 7 STS-3cs.

Generally, in one example embodiment, network element 110 (N1) packs Eos services by, for example, bundling STS-1s into groups of STS-3cs, to obtain a maximum usage rate of bandwidth (i.e., minimum fragmentation). In this example, if a GbE circuit requires 22 STS-1s, then source 101 bundles 22 STS-1s into 7 groups of STS-3cs and the 7 groups will be aligned to the STS-3C boundary. This provides the advantageous effect of guaranteeing that an OC192 interface, for example, will support a minimum of 178 STS-1 equivalent without blocking In a comparative example, where packing is performed in a first-come-first-served basis, only a 64 STS equivalent can be guaranteed. This is because there would be blocking when every third STS-1 is in use and an STS-3c is to be added. If the timeslots are 1, 4, 7, 10, 13, 16, . . . 189, and there are 64 STS-1s starting at these timeslots, there will be blocking if an STS-3c is added.

Figure 2:
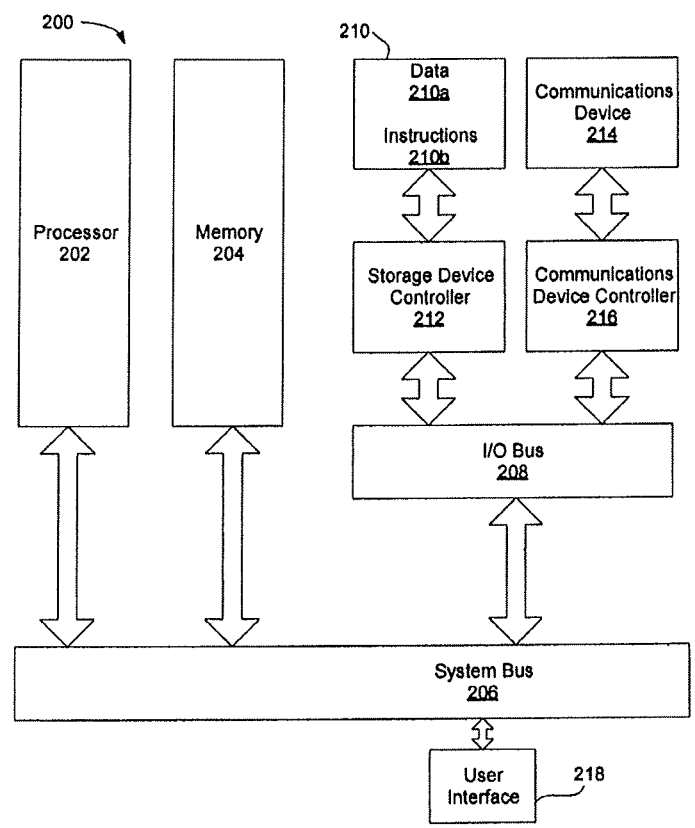
FIG. 2 is an architecture diagram of a processing system in accordance with an example embodiment described herein.

Reference is now made to FIG. 2, which is an architecture diagram of an example data processing system 200, which can be used according to various aspects herein. In one example embodiment, system 200 may further represent, and/or be included in, individual ones of the components illustrated in FIGS. 1A and 1B (e.g., network elements 110 (N1 to N4)). Data processing system 200 can be used to send and/or receive data transferred over a network, such as the network 101 described above, according to one example. Data processing system 200 includes a processor 202 coupled to a memory 204 via system bus 206. Processor 202 is also coupled to external Input/Output (I/O) devices (not shown) via the system bus 206 and an I/O bus 208, and at least one input/output user interface 218. Processor 202 may be further coupled to a communications device 214 via a communications device controller 216 coupled to the I/O bus 208 and bus 206. Processor 202 uses the communications device 214 to communicate with other elements of a network, such as, for example, network nodes such as other ones of the devices of FIGS. 1A and 1B, and the device 214 may have one or more input and output ports. Processor 202 also may include an internal clock (not shown) to keep track of time, periodic time intervals, and the like.

A storage device 210 having a computer-readable medium is coupled to the processor 202 via a storage device controller 212 and the I/O bus 208 and the system bus 206. The storage device 210 is used by the processor 202 and controller 212 to store and read/write data 210*a*, as well as computer program instructions 210*b* used to implement the procedure(s) described herein and shown in the accompanying drawing(s) herein (and, in one example, to implement the functions represented in FIGS. 3A and 3B). The storage device 210 also can be used by the processor 202 and the controller 212 to store other types of data, such as Ethernet traffic data. In operation, processor 202 loads the program instructions 210*b* from the storage device 210 into the memory 204. Processor 202 then executes the loaded program instructions 210*b* to perform any of the example procedure(s) described herein, for operating the system 200.

Figure 3A:
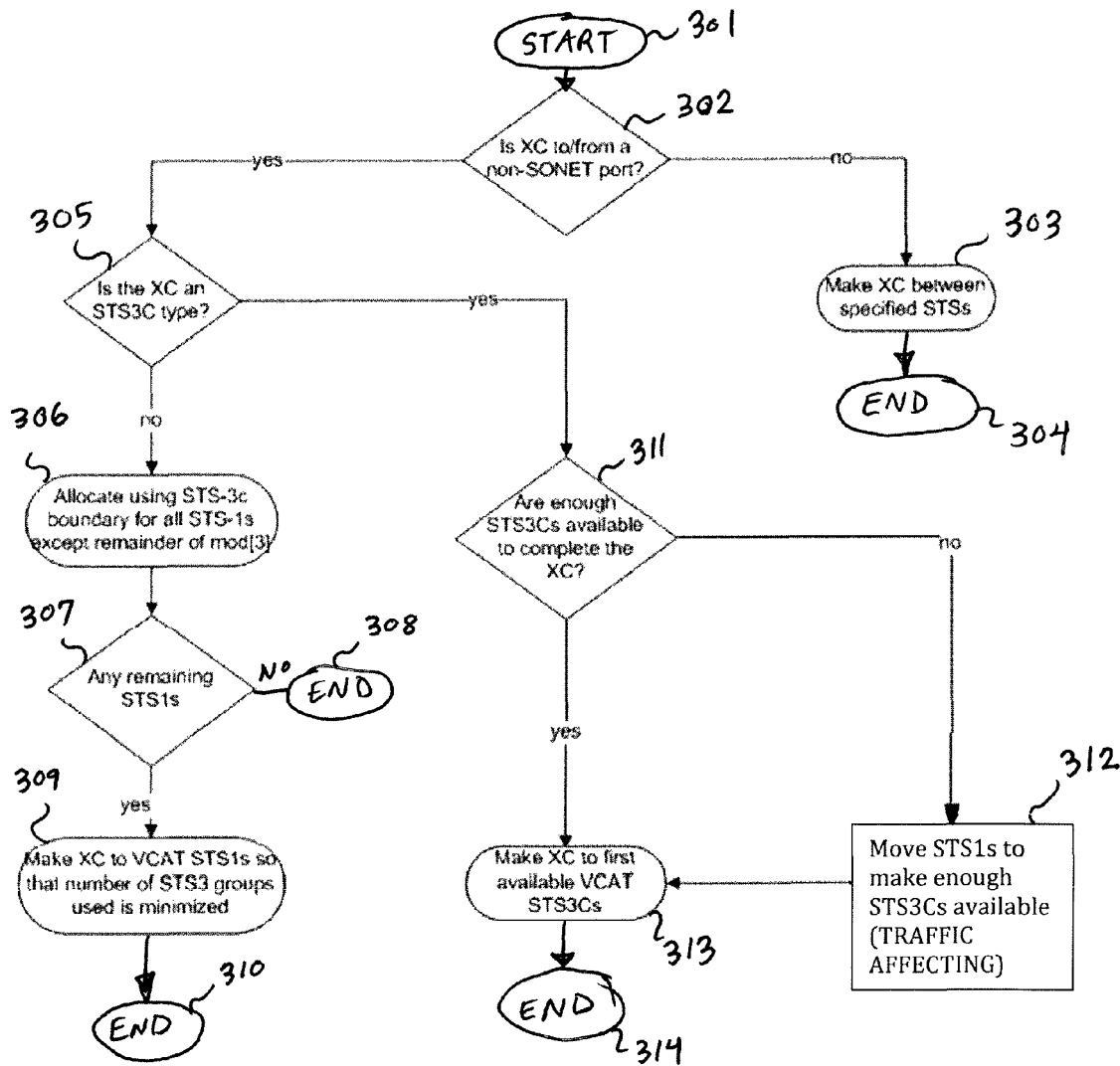
FIGS. 3A and 3B are flow diagrams that illustrate an example procedure for transferring traffic across a network, according to an example embodiment described herein.

FIG. 3A is a flow diagram that illustrates an example procedure for transferring traffic across a network such as network 101 of FIGS. 1A and 1B, according to an example embodiment described herein. As shown in FIG. 3A, the procedure begins at block 301, when network element N1 (110), for example, is requested by a network operator to transport data to network element N3 (110) on a particular circuit included in, for example, paths 120, 130 or 180 of FIGS. 1A and 1B. In block 302, the network operator determines if the particular circuit is an EoS circuit or not. In one example, the determination is made by determining whether the transport of data is to take place from a non-SONET port and to a non-SONET port.

If in block 302 it is determined that the particular circuit is not an EoS circuit, then the procedure advances to block 303. In block 303, a conventional process is performed to transfer data from, for example, network element N1 to network element N3, in which each STS is utilized separately on a first-come-first-serve basis.

If in block 302 it is determined that the particular circuit is an EoS circuit, then the procedure advances to block 305. In block 305, network element N1 (110) determines whether the Ethernet service or data service is being supported by STS-1 or STS-3C. This determination depends on a request of service received from the network user (i.e., network operator). Some data services require STS-1 while other data services can use either STS-1 or STS-3c.

If in block 305 it is determined that the Ethernet service or data service is supported by STS-1 and not STS-3c, then the procedure advances to block 306. In block 306, network element N1 (110) allocates all of the STS-1 services using STS-3c time boundaries, except for STS-1 services which remain after dividing the STS-1 services into groups. The procedure set forth in block 306 is described in more detail with respect to FIG. 3B.

Figure 3B:
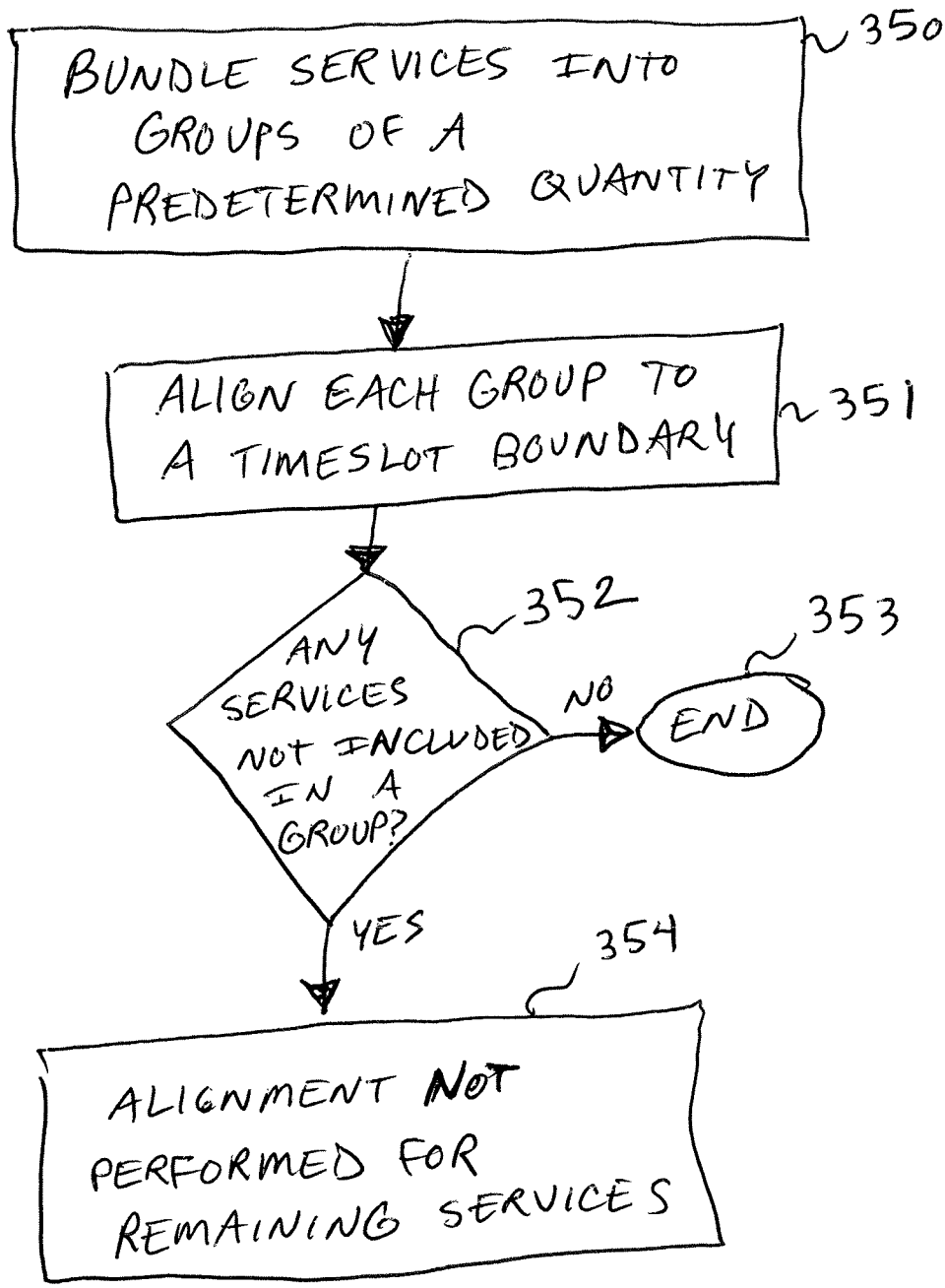

In FIG. 3B, in block 350, network element N1 (110) bundles the STS-1s into groups of a predetermined quantity, for example, three (3). In other example embodiments, the predetermined quantity can be twelve (12), forty-eight (48), or any other quanitity. In block 351, network element N1 (110) allocates the bundled groups of STS-1s by aligning each group to a timeslot boundary, for example, of an STS-3c. In block 352, network element N1 (110) determines if any services such as STS-1s have not been included in a group. If it is determined in block 352 that all services were included in a group, then block 306 ends (block 353) and the procedure advances to block 307. If it is determined in block 352 that there are any remaining services such as STS-1s, network element N1 (110) does not perform alignment for the remaining services (block 354) and the procedure advances to block 307. Thus, in block 306, the allocation is performed for all of the STS-1s, except for the STS-1s which are remaining and not included in a bundled group.

Figure 4:
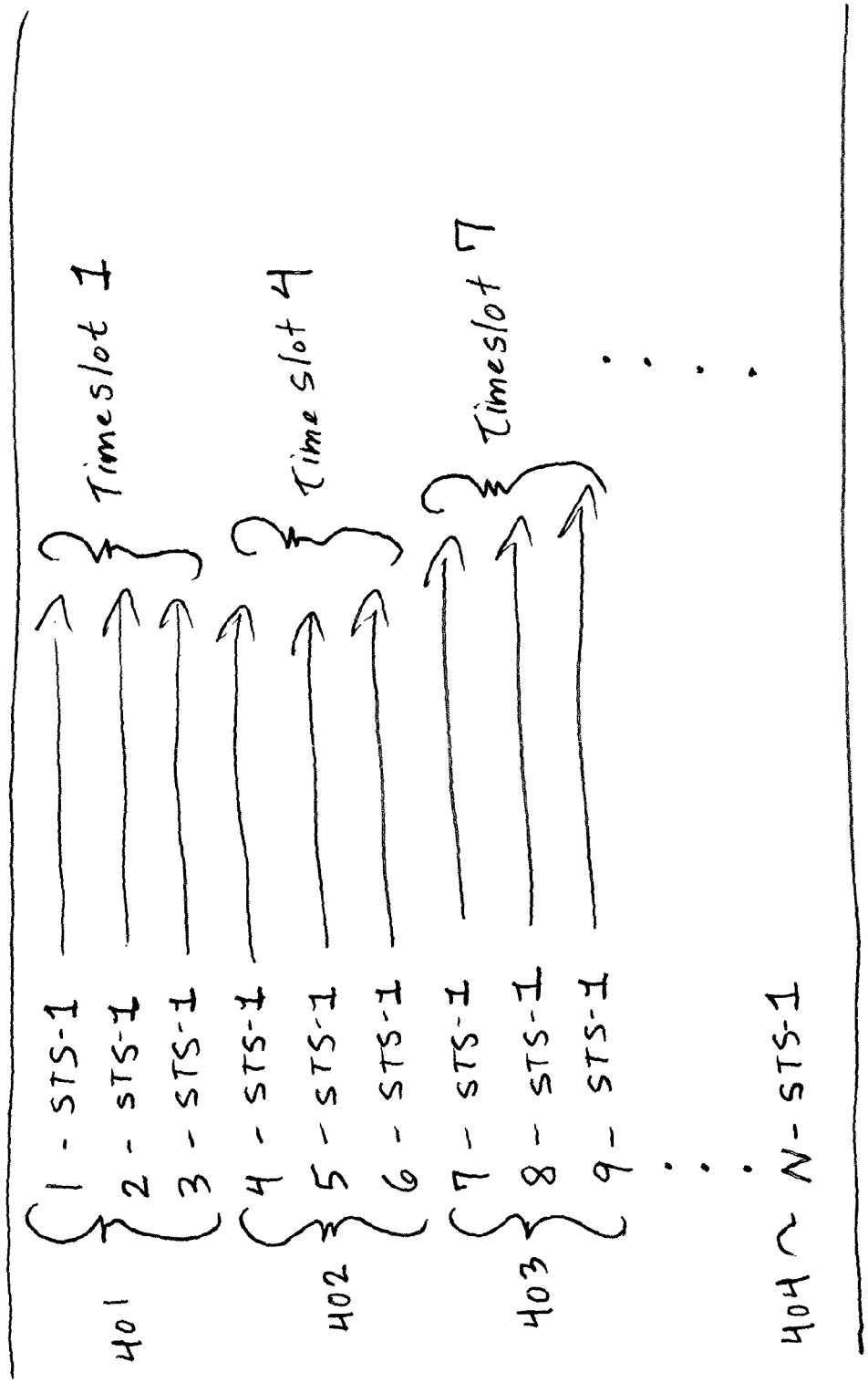
FIG. 4 is a diagrammatic representation illustrating an example transport pipe in which STS-Nc services have been bundled, according to an example embodiment described herein.

FIG. 4 is a diagrammatic representation illustrating an example transport pipe in which STS-Nc services have been bundled in block 305, according to an example embodiment described herein. As shown in FIG. 4, STS-1s 1 to 3 have been bundled into a group 401, STS-1s 4 to 6 have been bundled into a group 402, and STS-1s 7 to 9 have been bundled into a group 403. In addition, the groups have been aligned to the timeslot boundaries of STS-3cs. In particular, group 401 has been aligned to start with timeslot 1, group 402 has been aligned to start with timeslot 4, and group 403 has been aligned to start with timeslot 7. Of course, this example is not intended to be limited to bundling STS-1cs and in the manner represented in FIG. 4, and, in other example embodiments, other STS-Ncs can be bundled and other groupings and time slots can be employed.

By virtue of the foregoing arrangement, it can be possible to minimize bandwidth fragmentation by grouping members for common service into a bundle. In particular, bundling STS-1s can result in deterministic results where it is possible to guarantee non-blocking at least until the number of STS-1s goes above, for example, 178 STS-1 equivalent for an OC192 with 192 equivalent STS-1s and 10 services. This is because in a case with 10 services using an OC192 there will be 192 STS-1 timeslots with a maximum of 20 STS-1s not being included in a bundle when the STS-1s are bundled, for example, into groups of three (3). Since, in this example, the bundles are in groups of 3, 21 timeslots (i.e., 7 bundles) are allocated. For an STS-3c to not be available, each of the 7 bundles will have at least 1 STS-1 in use, resulting in at least 7 STS-1s in use. Thus, non-blocking can be guaranteed at least until the number of STS-1s goes above, for example, 178 STS-1 equivalent, as reflected in the following equation which is based on the foregoing described allocation: 192−21+7=178. As a result, this arrangement can reduce blocking Depending on the Ethernet service or data service, the service may require an x number of STS-1s where x is not divisible by 3. Thus, in block 307, network element N1 (110) determines whether there are any remaining STS-1s in the VCAT group, after the STS-1s have been bundled into groups of three (3). If in block 307 it is determined that there are no remaining STS-1s, then the transfer of traffic occurs over the bundled STS-1s and the procedure ends at block 308.

For example, in FIG. 4, reference numeral 404 represents an amount N of STS-1s in a transport pipe. As shown in FIG. 4, the STS-1s are represented as being bundled into groups of three (3) until reaching the N STS-1 (404). If N is divisible by three (3), then control passes to block 308 where the procedure ends. On the other hand, if N is not divisible by three (3), then there will be remaining STS-1s and control passes to block 309.

As mentioned above, if in block 307 it is determined that there are remaining STS-1s, then the procedure advances to block 309. In block 309, network element N1 (110) reallocates and packs together the remaining STS-1s with STS-1s which are left over from other EoS/Data circuits. Network element N1 (110) then makes the transfer of traffic, between, for example, network element N1 and network element N3, using the STS-1s so as to minimize the number of STS-3c groups being used. Since there are 10 services, for example, each having at most 2 STS-1 equivalent remaining, 7 bundles can be dedicated to facilitating a maximum remaining STS-1 equivalent. Thus, in the foregoing example, 7 bundles is a smallest number of bundles to allow handling of all cases. In one example, Ethernet traffic is segmented and inserted into the STS-1s at network element N1 and transported across the SONET network to network element N3 where the Ethernet traffic is reassembled and recreated. The procedure then ends at block 310.

With respect to the example number 178 discussed above, this number is a hypothetical case when, for example, each of ten client circuits created has a remainder of 2. This results in 20 STSs remaining This translates into 7 STS-3c equivalents. As circuits are added or deleted, a worst case is when for each of the 7 STS-3c equivalent, there is only one STS-1 left. This means that in the worst case, as discussed above, 14 STS-1s are stranded (192−14=178).

Referring again to block 305, if in block 305 it is determined that the Ethernet service or data service is supported by STS-3c, then the procedure advances to block 311. In block 311, network element N1 (110) checks whether there is sufficient STS-3c bandwidth and correct timeslot alignment for the STS-3c. To perform the check, the network element N1 (110) maintains information on which timeslots are in use, and performs a search of the timeslots to determine if there are three contiguous STS-1s in a corresponding STS-3c timeslot boundary. If it is determined that there is sufficient STS-3c bandwidth available and the STS-3c has a proper timeslot alignment in block 311, then network element N1 (110) makes a transfer of traffic to network element N3, using the first available STS-3c (block 313). In one example, if it is determined in block 311 that there is sufficient STS-3c bandwidth available and the STS-3c has a proper timeslot alignment, then all traffic is transferred to network element N3, the amount of traffic depending on a request from the network operator. The procedure then ends at block 314.

If there is sufficient STS-3c bandwidth but fragmentation exists in the timeslots based on the check performed in block 311, then the procedure advances to block 312. In order to determine whether fragmentation exists, the network element N1 (110) keeps track of how many timeslots are in use. If the network operator requests, for example, one STS-3c, then the network N1 (110) checks if there is at least three (3) timeslots available. If at least three timeslots are available, but there are not any STS-3cs available based on the check in block 311, then fragmentation exists. In block 312, network element N1 (110) moves or allocates existing STS-1s to create consecutive timeslots, for example, three, aligned to the STS-3c boundary, and then, in block 313, uses the newly created STS-3c to transfer the traffic to network element N3. This reallocation of existing STS-1 services may cause a brief interruption to the STS-1 service. After block 313, the procedure ends (block 314).

However, if there is sufficient STS-3c bandwidth but fragmentation is determined to exist in the timeslots based on the check performed in block 311, then block 312 is not performed, the procedure terminates and usage of the optical carrier (OCn) is denied for this service.

In the example of using OC192, block 311 is performed if there is already 178 STS-1 equivalent of the 192 STS-1s in use and the network operator is requesting an STS-3c.

As a result of the procedure set forth in FIGS. 3A and 3B, a data transfer can be performed between, for example, network elements N1 and N3, while guaranteeing a high usage rate of the services included in the VCAT used to transfer the data.

The devices and/or servers described herein may be, in one non-limiting example, a computer or farm of computers that facilitate the transmission, storage, and reception of information and other data between different points. From a hardware standpoint, in one example a server computer will typically include one or more components, such as one or more microprocessors (also referred to as "controllers") (not shown), for performing the arithmetic and/or logical operations required for program execution. Also in one example, a server computer will also typically include disk storage media (also referred to as a "memory"), such as one or more disk drives for program and data storage, and a random access memory, for temporary data and program instruction storage. From a software standpoint, in one example a server computer also contains server software resident on the disk storage media, which, when executed, directs the server computer in performing its data transmission and reception functions. As is well known in the art, server computers are offered by a variety of hardware vendors, can run different operating systems, and can contain different types of server software, each type devoted to a different function, such as handling and managing data from a particular source, or transforming data from one format into another format.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine-accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs. Indeed, the numbered parts of the above-identified procedures represented in the drawings may be representative of operations performed by one or more respective modules, wherein each module may include software, hardware, or a combination thereof.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. A procedure for transferring traffic across a packet network, comprising:
    bundling from a first circuit a plurality of common (Synchronous Transport Signal) STS-N (N being a positive integer) services into groups, the plurality of common STS-N services being included in a virtual concatenation group, wherein in a case that there are remaining STS-N services after bundling the STS-N services from the first circuit, the remaining STS-N services are packed together with other remaining STS-N services from other circuits; and
    transferring the traffic in accordance with the bundled groups of STS-N services.

2. The procedure according to claim 1, wherein the plurality of STS-N services are STS-1 services, and each bundled group of STS-1 services is aligned to a timeslot boundary of an STS-3c (c standing for concatenation) service.

3. The procedure according to claim 1, further comprising:
   determining whether a data service of the packet network is supported by STS-1 services or STS-3c (c standing for concatenation) services; and
   if it is determined that STS-1 services are supported, bundling the STS-1 services of the virtual concatenation group into groups of a predetermined quantity.

4. The procedure according to claim 3, wherein the predetermined quantity is three (3).

5. The procedure according to claim 3, wherein if it is determined that STS-3c services are supported, checking an availability of bandwidth and an alignment of the STS-3c services.

6. The procedure according to claim 5, further comprising, based on the checking, if there is available STS-3c bandwidth and there is alignment provided for the STS-3c services, using the STS-3c services to transfer the traffic in the transferring.

7. The procedure according to claim 5, further comprising, based on the checking, if there is available STS-3c bandwidth but there is fragmentation with respect to the alignment of the STS-3c services, creating consecutive timeslots aligned to a STS-3c boundary using STS-1 services, and using newly created STS-3c services to transfer the traffic in the transferring.

8. An apparatus for transferring traffic across a packet network, the apparatus comprising:
   at least one processor; and
   a memory coupled to the at least one processor to store instructions such that the at least one processor is arranged to bundle from a first circuit a plurality of common (Synchronous Transport Signal) STS-N (N being a positive integer) services into groups, the plurality of common STS-N services being included in a virtual concatenation group, wherein in a case that there are remaining STS-N services after bundling the STS-N services from the first circuit, the at least one processor packs the remaining STS-N services together with other remaining STS-N services from other circuits, and
   wherein the at least one processor is further arranged to transfer the traffic in accordance with the bundled groups of STS-N services.

9. The apparatus according to claim 8, wherein the plurality of STS-N services are STS-1 services, and the at least one processor aligns each bundled group of STS-1 services to a timeslot boundary of an STS-3c (c standing for concatenation) service.

10. The apparatus according to claim 8, the at least one processor being further arranged to determine whether a data service of the packet network is supported by STS-1 services or STS-3c (c standing for concatenation) services, and if it is determined that STS-1 services are supported, bundle the STS-1 services of the virtual concatenation group into groups of a predetermined quantity.

11. The apparatus according to claim 10, wherein the predetermined quantity is three (3).

12. The apparatus according to claim 10, wherein if it is determined that STS-3c services are supported, the at least one processor checks an availability of bandwidth and an alignment of the STS-3c services.

13. The apparatus according to claim 12, wherein, based on the checking, if there is available STS-3c bandwidth and there is alignment provided for the STS-3c services, then the at least one processor uses the STS-3c services to transfer the traffic in the transferring.

14. The apparatus according to claim 12, wherein, based on the checking, if there is available STS-3c bandwidth but there is fragmentation with respect to the alignment of the STS-3c services, then the at least one processor uses STS-1 services to create consecutive timeslots aligned to a STS-3c boundary, and uses newly created STS-3c services to transfer the traffic in the transferring.

15. A non-transitory computer-readable storage medium on which is stored computer-executable process steps for causing an apparatus for transferring traffic across a packet network to perform the following:
   bundle from a first circuit a plurality of common (Synchronous Transport Signal) STS-N (N being a positive integer) services included in a virtual concatenation group, wherein in a case that there are remaining STS-N services after bundling the STS-N services from the first circuit, the remaining STS-N services are packed together with other remaining STS-N services from other circuits; and
   transfer the traffic in accordance with the bundled plurality of STS-N services.

16. The non-transitory computer-readable storage medium according to claim 15, wherein the plurality of STS-N services are STS-1 services, and each bundle of STS-1 services is aligned to a timeslot boundary of an STS-3c (c standing for concatenation) service.

17. The non-transitory computer-readable storage medium according to claim 15, wherein the process steps further comprise steps for causing the apparatus to determine whether a data service of the packet network is supported by STS-1 services or STS-3c (c standing for concatenation) services, and if it is determined that STS-1 services are supported, bundle the STS-1 services of the virtual concatenation group into groups of a predetermined quantity.

* * * * *